US012331592B2

(12) United States Patent
Foley et al.

(10) Patent No.: US 12,331,592 B2
(45) Date of Patent: Jun. 17, 2025

(54) DEEP LADDER TRAY

(71) Applicant: Tricam Industries, Inc., Eden Prairie, MN (US)

(72) Inventors: Joseph P. Foley, St. Paul, MN (US); Benjamin P. Williams, Chaska, MN (US); Benjamin M. Wernberg, Savage, MN (US)

(73) Assignee: Tricam Industries, LLC, Eden Prairie, MN (US)

( * ) Notice: Subject to any disclaimer, the term of this patent is extended or adjusted under 35 U.S.C. 154(b) by 1120 days.

(21) Appl. No.: 17/130,414

(22) Filed: Dec. 22, 2020

(65) Prior Publication Data

US 2022/0195800 A1 Jun. 23, 2022

(51) Int. Cl.
*E06C 1/39* (2006.01)
*E06C 1/18* (2006.01)
*E06C 7/14* (2006.01)

(52) U.S. Cl.
CPC .................. *E06C 1/39* (2013.01); *E06C 1/18* (2013.01); *E06C 7/14* (2013.01)

(58) Field of Classification Search
CPC ..... E06C 1/39; E06C 1/18; E06C 7/14; E06C 1/393; E06C 1/20
See application file for complete search history.

(56) References Cited

U.S. PATENT DOCUMENTS 2,470,053 A 5/1949 Salisbury
2,485,413 A 10/1949 Ross
2,650,014 A 8/1953 Harrison
2,865,546 A 12/1958 Shull
2,899,008 A 8/1959 Larson
2,957,542 A 10/1960 Rizzuto
3,446,310 A 5/1969 Alfie
3,625,388 A 12/1971 Golden et al.
3,744,591 A 7/1973 Lucci et al.
4,270,463 A 6/1981 Korzon
4,452,484 A 6/1984 Pastor
4,485,892 A 12/1984 Maloney
4,502,564 A 3/1985 Kümmerlin et al.
4,586,586 A 5/1986 Canals
4,653,713 A 3/1987 Hamilton
4,936,463 A 6/1990 Tiramani
4,979,590 A 12/1990 Bailey
5,035,389 A 7/1991 Wang
(Continued)

FOREIGN PATENT DOCUMENTS

AU 2007101150 1/2008
DE 202007000406 U1 * 3/2008 .............. E06C 1/22
(Continued)

OTHER PUBLICATIONS

Rubbermaid, 3-Step Aluminum Step Stool with Project Tray, 2016, https://web.archive.org/web/20161203170229/http://www.homedepot.com/p/Rubbermaid-3-Step-Aluminum-Step-Stool-with-Project-Tray-250-lb-Load-Capacity-Type-I-Duty-Rating-RMA-3XST-COM/206877736 (Year: 2016).*
(Continued)

*Primary Examiner* — Patrick J Maestri

(57) ABSTRACT

A tray for a stepladder is disclosed. The tray provides an area for work space or for storage of tools or materials in addition to that provided by the stepladder by itself. The tray is configured to fit within the boundaries of the stepladder when the stepladder is in its stored orientation.

20 Claims, 12 Drawing Sheets

(56) References Cited

U.S. PATENT DOCUMENTS

| | | | |
|---|---|---|---|
| 5,052,581 A | 10/1991 | Christ et al. | |
| 5,120,013 A | 6/1992 | Sweeney | |
| 5,240,214 A | 8/1993 | Bimbaum | |
| 5,337,857 A | 8/1994 | Spalt | |
| 5,370,263 A | 12/1994 | Brown | |
| 5,421,428 A | 6/1995 | Ingles | |
| 5,573,081 A | 11/1996 | Bartnicki et al. | |
| 5,584,357 A | 12/1996 | Gugel | |
| 5,613,574 A | 3/1997 | Melanson | |
| 5,622,010 A | 4/1997 | Weber | |
| 5,673,885 A | 10/1997 | Pham | |
| 5,722,507 A | 3/1998 | Kain | |
| 5,740,883 A | 4/1998 | Trank | |
| 5,782,314 A | 7/1998 | Zeitler | |
| 5,873,433 A | 2/1999 | Katz | |
| 5,913,380 A | 6/1999 | Gugel | |
| 5,967,260 A | 10/1999 | Spak | |
| 6,012,548 A | 1/2000 | Kim | |
| 6,098,748 A | 8/2000 | Harper | |
| 6,347,687 B1 | 2/2002 | Alim | |
| 6,390,237 B1 | 5/2002 | Kim et al. | |
| 6,390,238 B1 | 5/2002 | Gibson | |
| 6,401,862 B1 | 6/2002 | Caron | |
| 6,427,805 B1 | 8/2002 | Gibson et al. | |
| 6,443,260 B1 | 9/2002 | Katz | |
| 6,443,261 B1 | 9/2002 | Gibson | |
| 6,467,577 B1 | 10/2002 | Charlebois, Jr. | |
| 6,550,579 B2 | 4/2003 | Gibson | |
| 6,698,699 B1 | 3/2004 | Bailey | |
| 6,883,529 B2 | 4/2005 | Kvaternik | |
| 6,902,034 B2 | 6/2005 | Gibson et al. | |
| 7,000,732 B1 | 2/2006 | Briggs, Jr. | |
| 7,032,711 B1 | 4/2006 | Katz et al. | |
| 7,108,103 B2 | 9/2006 | Meeker | |
| 7,128,187 B2 | 10/2006 | Simpson | |
| D541,432 S | 4/2007 | Rapp | |
| 7,204,343 B1 | 4/2007 | Seaman | |
| D548,364 S | 8/2007 | Skubic | |
| D554,771 S | 11/2007 | Skubic | |
| 7,370,726 B1 | 5/2008 | Chavez | |
| 7,415,933 B2 | 8/2008 | Sagol | |
| 7,648,108 B2 | 1/2010 | Peterson | |
| 7,861,826 B2 | 1/2011 | Meyers et al. | |
| 7,886,827 B2 | 2/2011 | Adams | |
| 7,886,872 B2 | 2/2011 | Astor et al. | |
| 7,931,123 B2 | 4/2011 | Moldthan | |
| 7,967,111 B2 | 6/2011 | Meyers et al. | |
| D642,283 S | 7/2011 | Ericksson | |
| 8,186,481 B2 | 5/2012 | Moss et al. | |
| 8,272,478 B2 | 9/2012 | Astor | |
| 8,397,870 B2 * | 3/2013 | Parker | E06C 7/14 182/20 |
| 8,453,796 B2 | 6/2013 | Astor | |
| 8,579,083 B2 | 11/2013 | Astor | |
| 8,596,454 B1 | 12/2013 | Carlson | |
| 8,997,931 B2 | 4/2015 | Parker | |
| 9,309,718 B1 | 4/2016 | Matthew | |
| 9,428,958 B1 | 8/2016 | Ellis | |
| D766,461 S | 9/2016 | Moss et al. | |
| D766,462 S | 9/2016 | Moss et al. | |
| D777,350 S | 1/2017 | Moss et al. | |
| 9,714,541 B2 | 7/2017 | Astor | |
| 9,714,542 B1 | 7/2017 | Astor | |
| 9,850,706 B2 | 12/2017 | Astor | |
| D833,643 S | 11/2018 | Foley | |
| 10,138,680 B2 | 11/2018 | Williams et al. | |
| 10,184,292 B2 | 1/2019 | Latimer | |
| 10,208,538 B2 | 2/2019 | Astor | |
| 10,619,416 B1 | 4/2020 | Snell | |
| 10,633,918 B2 | 4/2020 | Wulfekotte | |
| 10,648,234 B2 | 5/2020 | Skubic | |
| 10,709,238 B1 | 7/2020 | Thompson | |
| 10,801,263 B2 | 10/2020 | Dangrow | |
| 11,167,407 B2 | 11/2021 | McGee | |
| 2002/0017430 A1 | 2/2002 | Rosko | |
| 2002/0017431 A1 | 2/2002 | Gibson | |
| 2002/0104709 A1 | 8/2002 | Hines | |
| 2003/0029676 A1 | 2/2003 | Gibson | |
| 2004/0000449 A1 | 1/2004 | Meeker | |
| 2004/0007424 A1 | 1/2004 | Simpson | |
| 2005/0284701 A1 | 12/2005 | Gibson et al. | |
| 2006/0006024 A1 | 1/2006 | Till | |
| 2007/0120028 A1 | 5/2007 | Kane | |
| 2007/0163837 A1 | 7/2007 | Dyer | |
| 2007/0181369 A1 | 8/2007 | Gibson | |
| 2007/0193829 A1 | 8/2007 | Astor | |
| 2007/0240935 A1 | 10/2007 | O'Brien | |
| 2007/0284191 A1 | 12/2007 | Astor | |
| 2007/0284192 A1 | 12/2007 | Meyers | |
| 2009/0078504 A1 | 3/2009 | Astor | |
| 2009/0272602 A1 | 11/2009 | Kocher | |
| 2010/0224445 A1 | 9/2010 | Moss et al. | |
| 2011/0024234 A1 | 2/2011 | Lin | |
| 2012/0211305 A1 | 8/2012 | Moss et al. | |
| 2012/0217093 A1 | 8/2012 | Latimer | |
| 2012/0228059 A1 | 9/2012 | Lampe et al. | |
| 2013/0146394 A1 | 6/2013 | Astor | |
| 2013/0270037 A1 | 10/2013 | Pensieri | |
| 2014/0054112 A1 | 2/2014 | Astor | |
| 2014/0224585 A1 | 8/2014 | Russell | |
| 2014/0326538 A1 | 11/2014 | Najey | |
| 2014/0332316 A1 | 11/2014 | Tiber et al. | |
| 2015/0014094 A1 | 1/2015 | Brooks | |
| 2015/0090533 A1 | 4/2015 | Moss et al. | |
| 2015/0159434 A1 | 6/2015 | Leng | |
| 2016/0024845 A1 | 1/2016 | Coe | |
| 2016/0038789 A1 | 2/2016 | Cheyne | |
| 2016/0177626 A1 | 6/2016 | Miller | |
| 2016/0348434 A1 | 12/2016 | Williams | |
| 2017/0251826 A1 | 9/2017 | Sclare | |
| 2017/0281826 A1 | 9/2017 | Sclare | |
| 2017/0328131 A1 | 11/2017 | Woodward | |
| 2020/0170419 A1 | 6/2020 | Sclare | |
| 2020/0190905 A1 | 6/2020 | Foley | |
| 2020/0270946 A1 | 8/2020 | Lawery | |
| 2021/0037989 A1 | 2/2021 | Rogers | |

FOREIGN PATENT DOCUMENTS

| | | | |
|---|---|---|---|
| FR | 2777593 | 10/1999 | |
| FR | 2816984 | 5/2022 | |
| KR | 10-2099306 | 4/2020 | |
| WO | WO-9947783 A1 * | 9/1999 | E06C 1/387 |
| WO | WO 2010/084135 | 7/2010 | |

OTHER PUBLICATIONS

International Search Report and Written Opinion for International Application No. PCT/US2021/064792, dated Apr. 19, 2022, 8 pages.

Polder® 3-Step Ladder. Crate and Barrel, http://www.crateandbarrel.com/polder-3-step-ladder/s451498, accessed May 6, 2015.

Cosco Signature Series 6 ft. Premium Aluminum Step Ladder, Home Depot, http://www.homedepot.com/p/Cosco-Signature-Series-6-ft-Premium-Aluminum-Step-Ladder-2061AABLD/203642157, accessed May 6, 2015.

Werner 4 ft. Fiberglass Platform Step Ladder with 375 lb. Load Capacity Type IAA Duty Rating. Home Depot, http://www.homedepot.com/p.Werner-4-ft-Fiberglass-Platform-Step-Ladder-with-374-lb-Load-Capacity-Type-IAA-Duty-Rating-P7404/203134335, accessed May 6, 2015.

Application and File History for U.S. Appl. No. 14/617,441, filed Feb. 9, 2015. Inventors: Jeff Skubic et al.

* cited by examiner

DEEP LADDER TRAY

TECHNICAL FIELD

The present invention relates to a folding tray for use with a ladder that provides for more depth and, thus more volume, but may be conveniently stored within the boundaries of the stepladder when not in use.

BACKGROUND

Ladders, step stools, and stepladders are generally known in the art. Kummerlin, U.S. Pat. No. 4,502,564, discloses a foldable step ladder. Because of their desired portability, foldable stepladders often include handles and other features that make them easier to transport. Lucci, U.S. Pat. No. 3,744,591, discloses a portable, folding stepladder.

When working on a ladder, step stool, or stepladder, it is often desirable to have tools, paint, and other necessary objects within easy reach. For example, it is known to removably attach a paint roller tray to the rung of a ladder to more easily paint a ceiling or other area requiring a ladder. Golden, U.S. Pat. No. 3,625,388, discloses a paint tray particularly useful with an upright ladder.

Utility trays for use with ladder, step stool, or stepladder are also known in the art. Pham, U.S. Pat. No. 5,673,885, discloses a paint tray for a stepladder for storing work materials, tools and a paint bucket that is held onto the stepladder by retaining means. Melanson, U.S. Pat. No. 5,613,574, discloses a stepladder mounted tool holster and parts tray that removably clamps onto the top step of a stepladder. Katz et al., U.S. Pat. No. 6,443,260, discloses a stepladder tray pivotally attached to the top cap of a stepladder for supporting tools and the like. Christ et al., U.S. Pat. No. 5,052,581, discloses a detachable ladder support tray for supporting tools and paint containers. Improvements to add to the amount of space available at the top of a stepladder include U.S. Pat. No. 10,138,680 to Williams, et al., for a hinged tray for a ladder or step stool.

In addition to utility trays that are removable, there are also trays that are permanently attached to the structure of ladder, step stool, or stepladder. U.S. patent No. Williams, et al., U.S. Pat. No. 10,138,680, discloses a hinged tray for a ladder or step stool in which the tray is located at the top of the ladder or step stool, and folds to a depth that is not deeper than the folded ladder depth.

It is often inconvenient, however, to use a removable utility tray with a ladder, step stool or step ladder. In some instances, the tray may be difficult to attach or remove from the ladder, step stool, or stepladder depending on the configuration of the top cap of the ladder, step stool, or stepladder. The removable tray and ladder, step stool, or stepladder usually must be stored separately, taking up additional space. Additionally, to move a ladder, step stool, or stepladder from place to place, the tray may need to be removed and carried separately because of weight or awkward transport configuration. Further, trays located at the top of a ladder, step stool, or stepladder may interfere with use of the ladder, step stool, or stepladder and is often limited in size due to their location.

There is a need in the industry to have tray incorporated into the structure of a ladder, step stool, or stepladder to hold tools and hardware that can be stored within the boundaries of the ladder, step stool, or stepladder.

SUMMARY

In embodiments, a folding tray for ladder, step stool, or stepladder is disclosed. Throughout the specification is to be understood that the use of ladder, step stool, or stepladder are interchangeable and the disclosed device may be used with any of the climbing apparatuses. The tray allows for a larger work area on stepladder while the tray can be folded or pivoted to be stored within the boundaries of the closed stepladder. The tray provides a larger and deeper work and storage area than prior art ladder trays without increasing storage space requirements.

It is an object of the invention to provide an innovative deeper utility tray for use with stepladders. It is also an object of the invention to provide a hinged tray that is integral to the structure of the stepladder. It is another object of the invention to provide a deep hinged tray that fits within the outer boundaries of the closed stepladder to eliminate any impact on storing of the stepladder from the tray.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
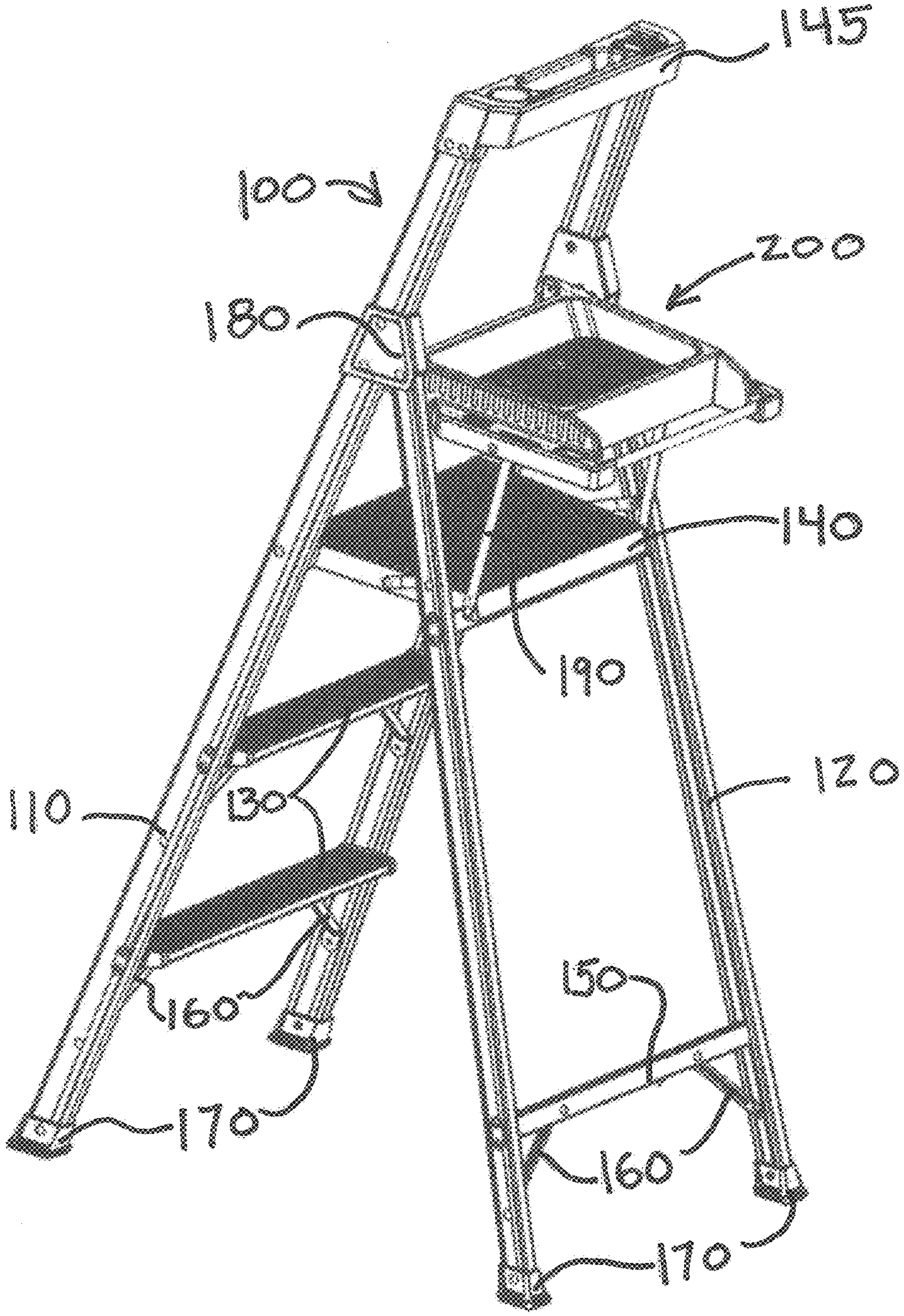
FIG. 1 is a rear isometric view of a stepladder in an in-use orientation incorporating an embodiment of the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 2:
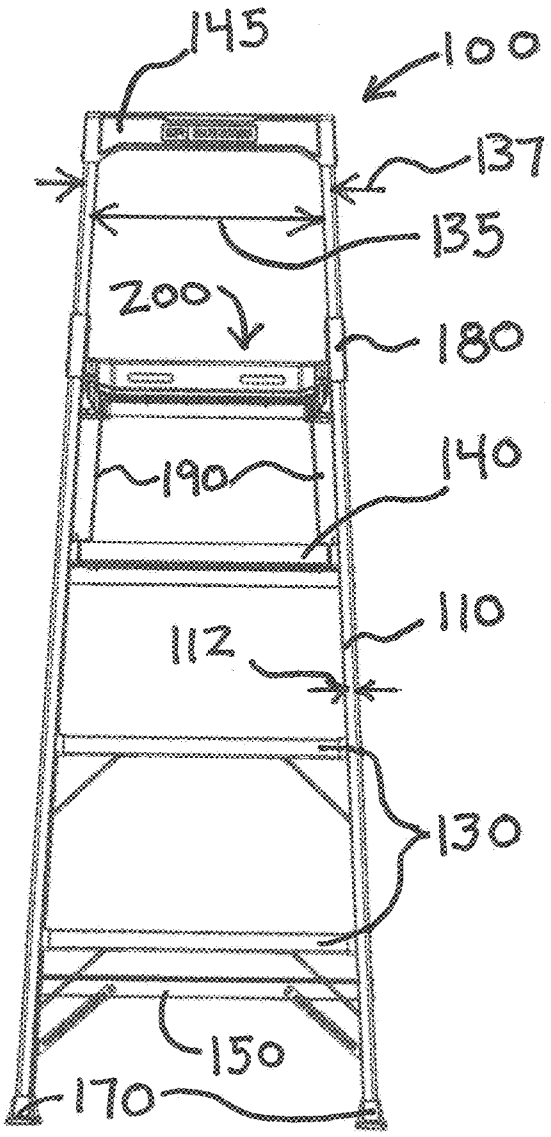
FIG. 2 is a front elevation view of the stepladder of FIG. 1.
Figure 3:
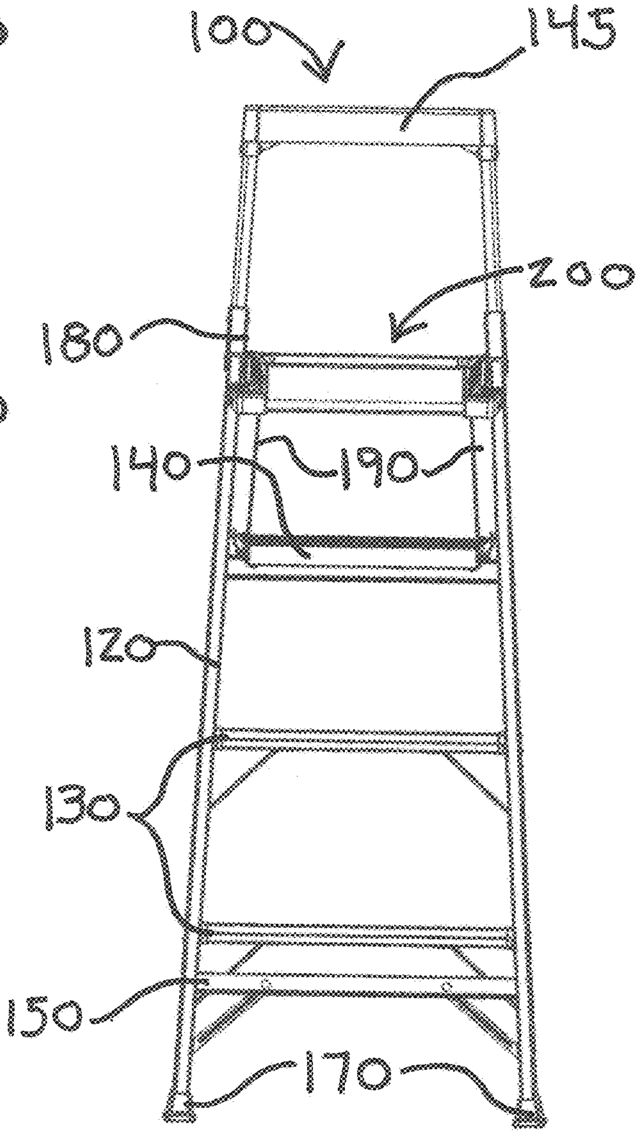
FIG. 3 is rear elevation view of the stepladder of FIG. 1.
Figure 4:
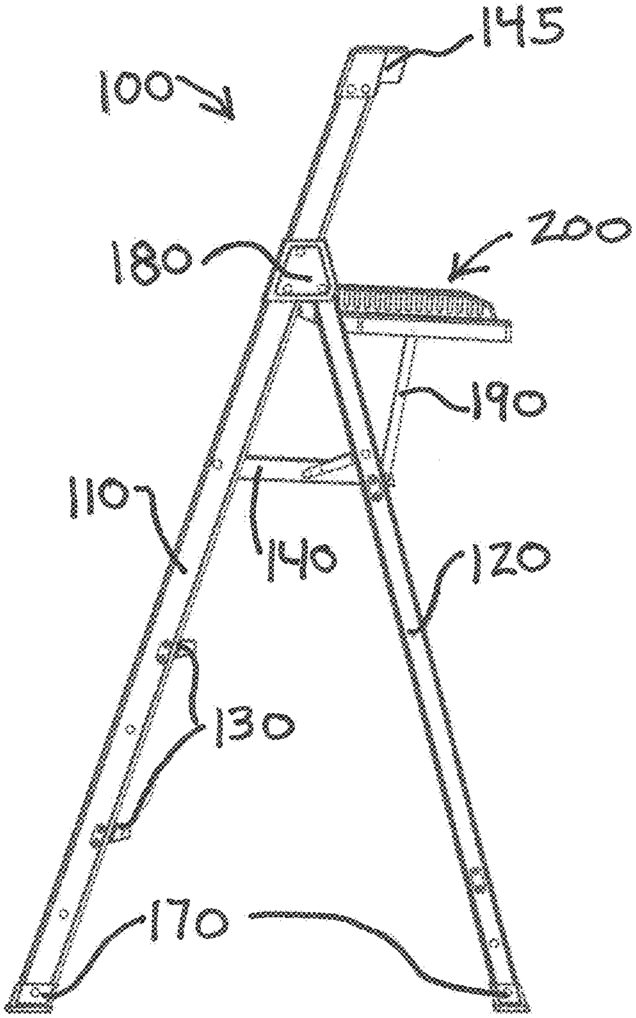
FIG. 4 is right side elevation view of the stepladder of FIG. 1.
Figure 5:
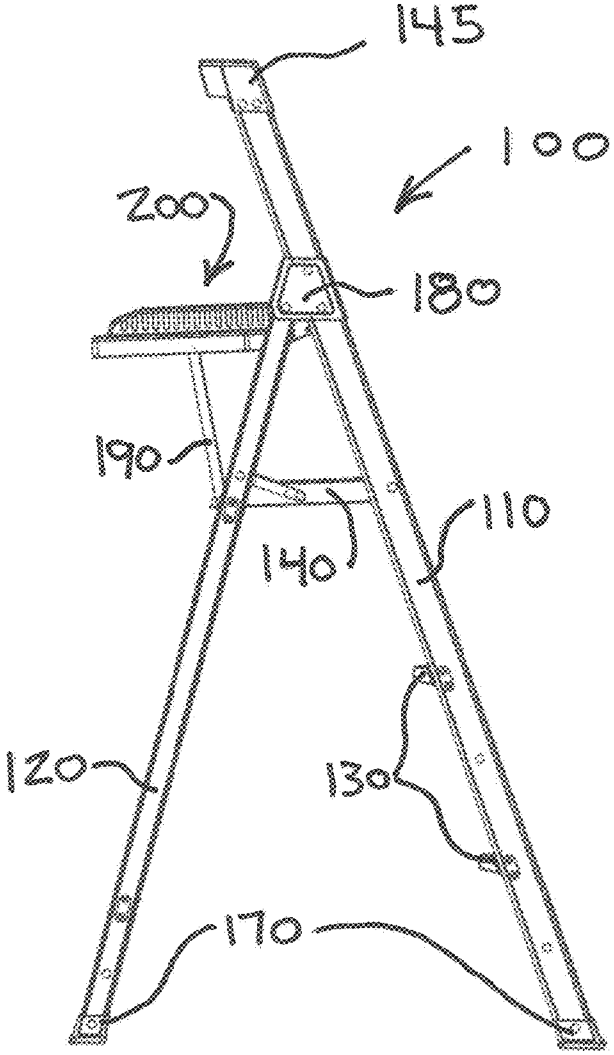
FIG. 5 is a left side elevation view of the stepladder of FIG. 1.
Figure 6:
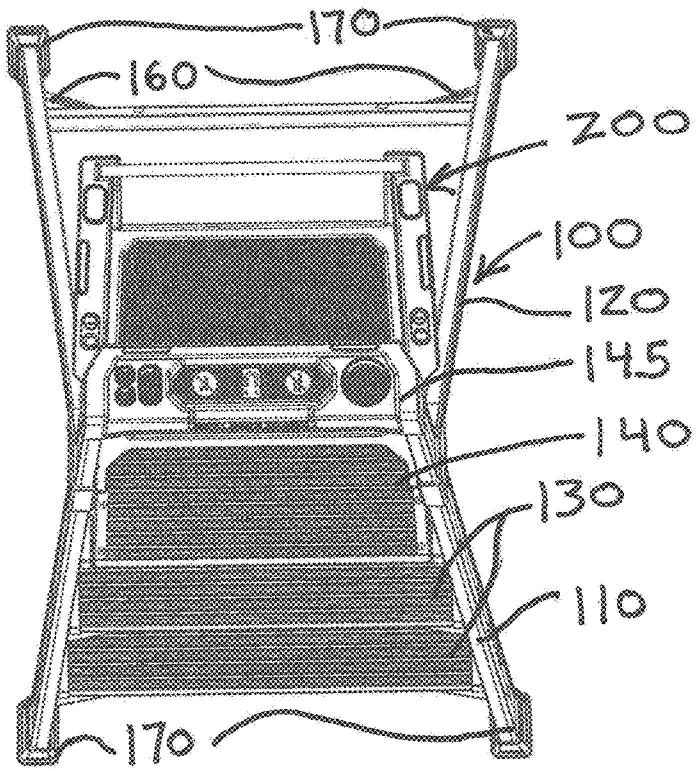
FIG. 6 is a top view of the stepladder of FIG. 1.
Figure 7:
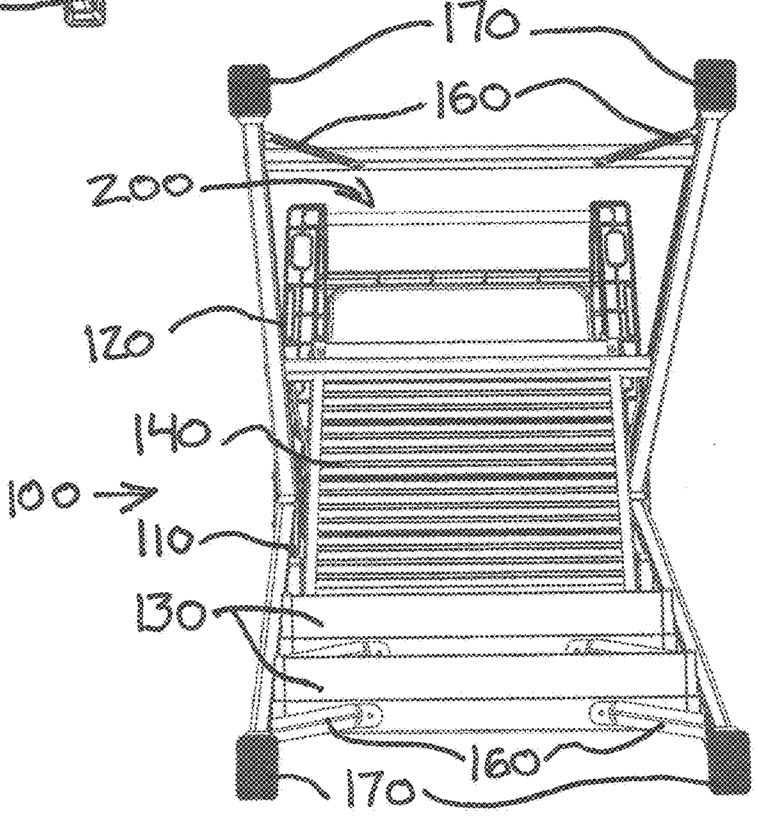
FIG. 7 is a bottom view of the stepladder of FIG. 1.
Figure 8:
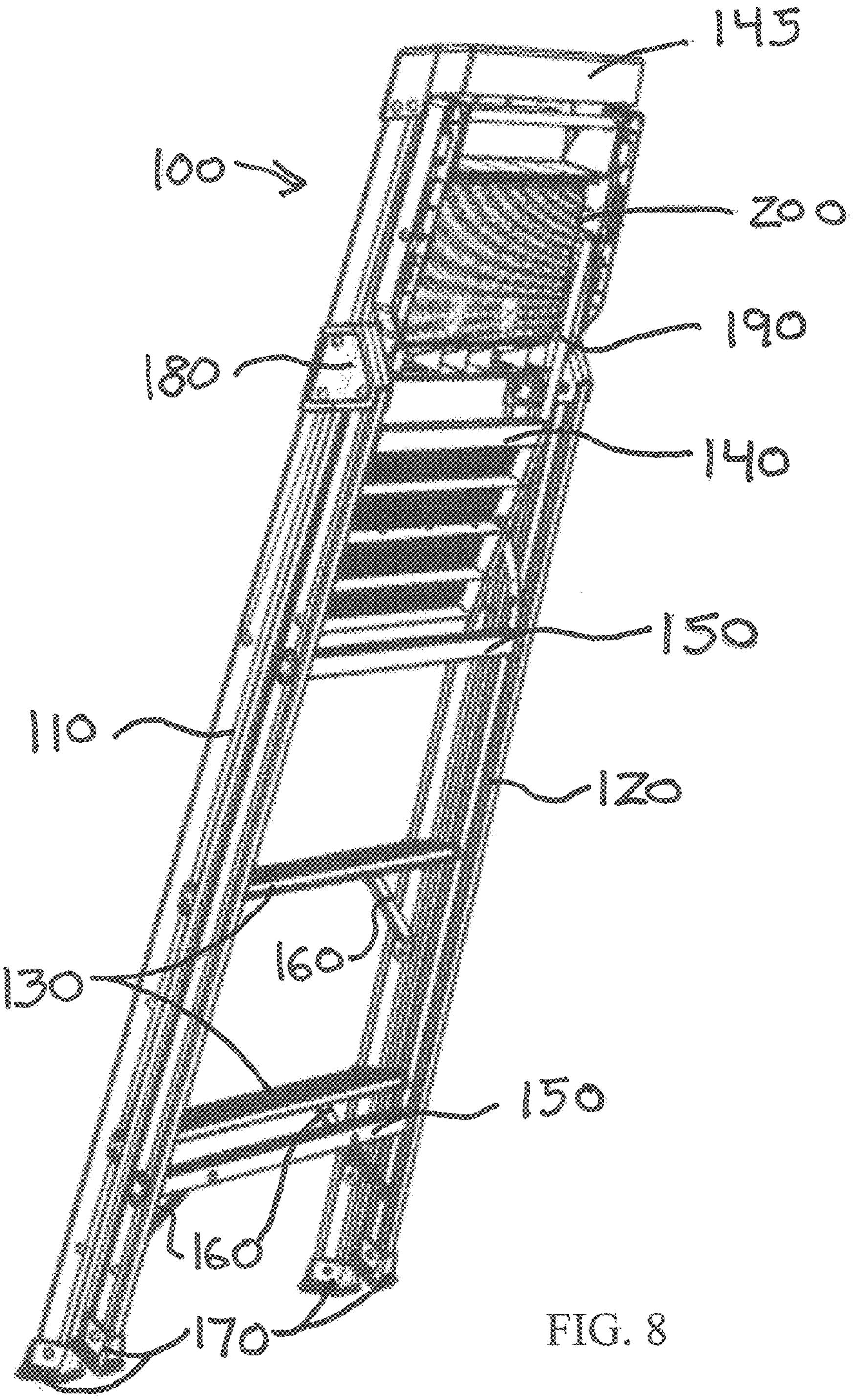
FIG. 8 is a rear isometric view of a stepladder in a stored orientation incorporating an embodiment of the invention.
Figure 9:
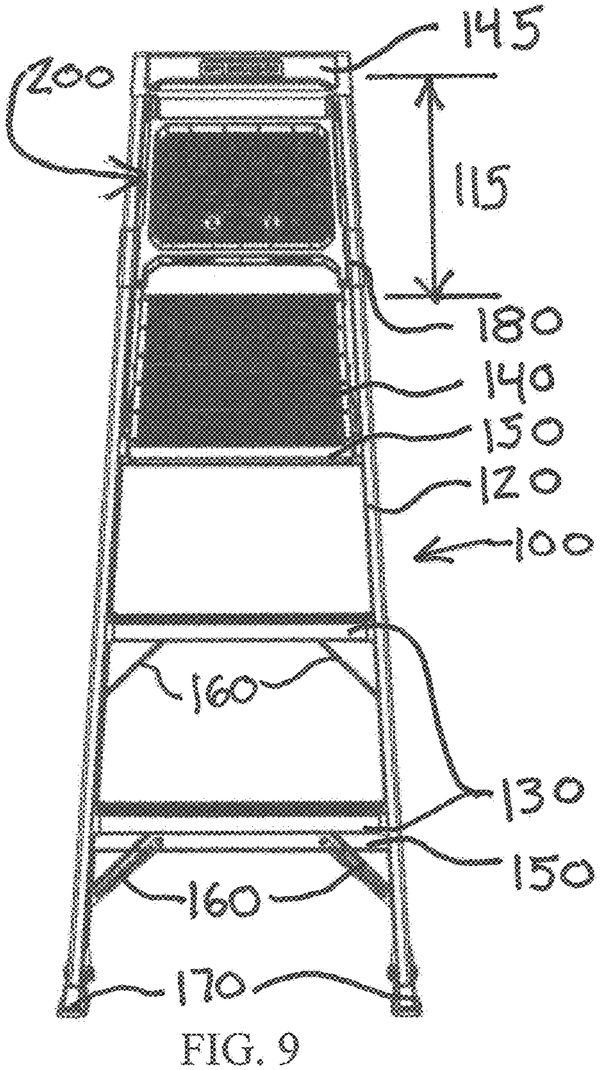
FIG. 9 is a front elevation view of the stepladder of FIG. 8.
Figure 10:
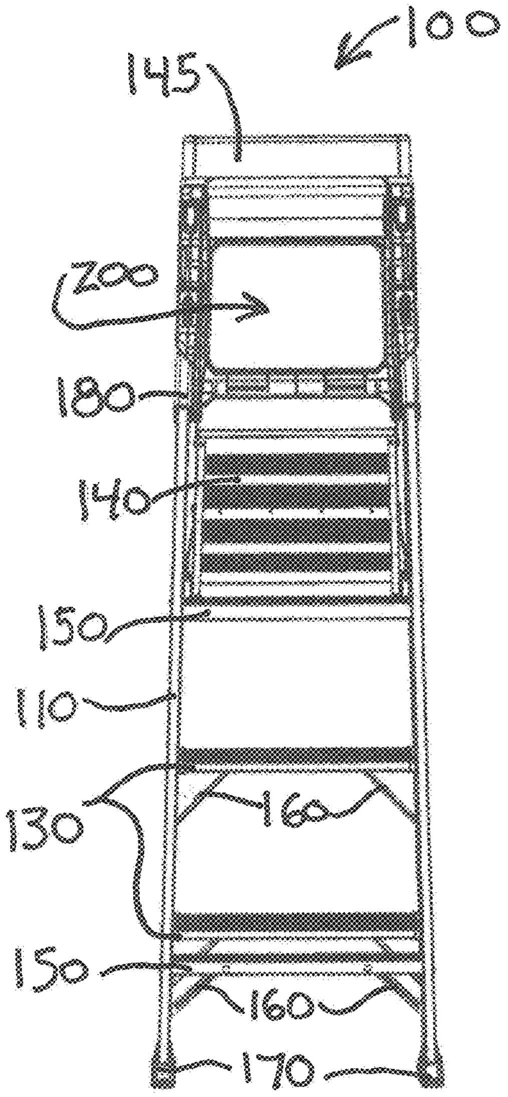
FIG. 10 is rear elevation view of the stepladder of FIG. 8.
Figure 11:
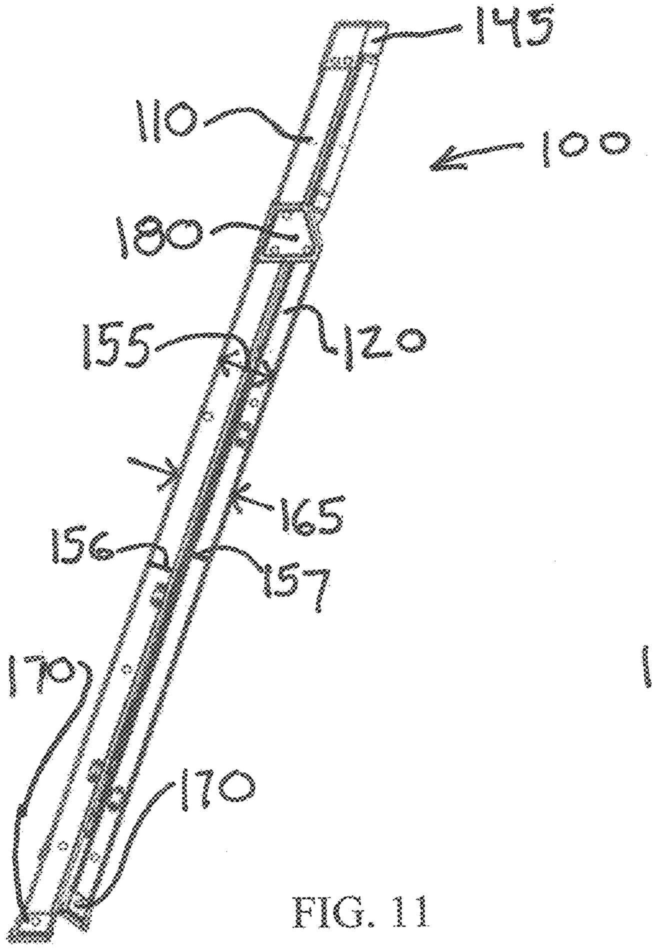
FIG. 11 is right side elevation view of the stepladder of FIG. 8.
Figure 12:
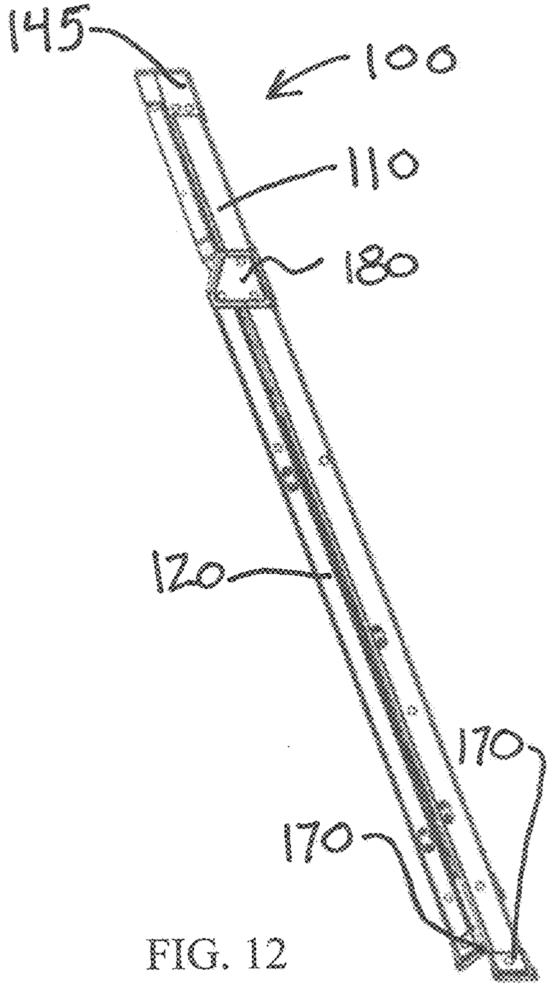
FIG. 12 is a left side elevation view of the stepladder of FIG. 8.
Figure 13:
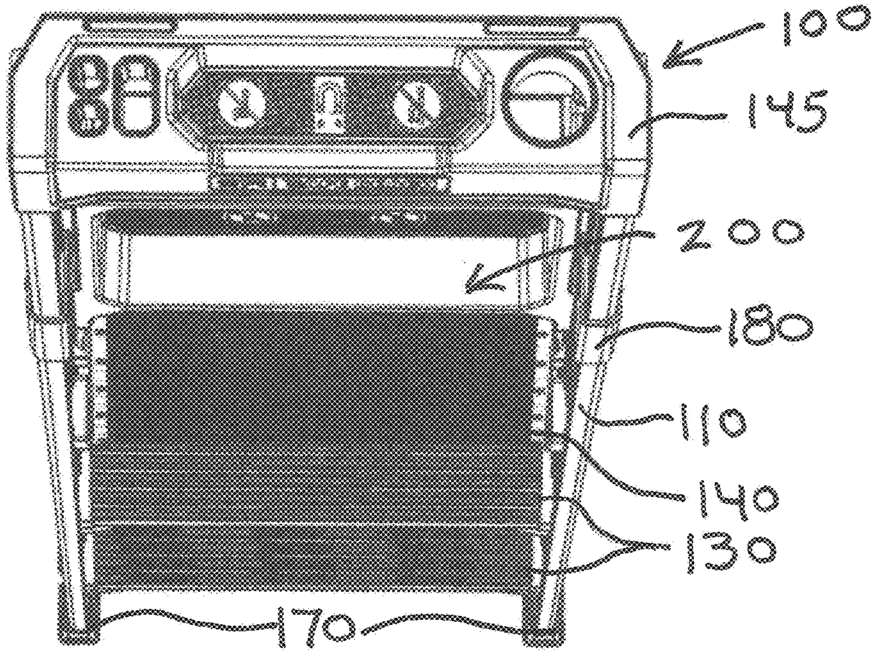
FIG. 13 is a top view of the stepladder of FIG. 8.
Figure 14:
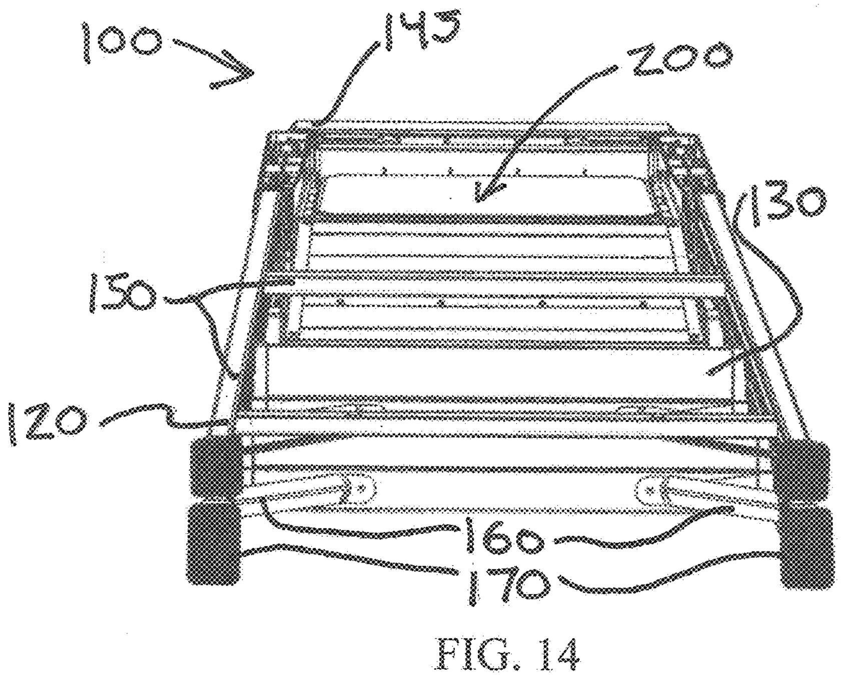
FIG. 14 is a bottom view of the stepladder of FIG. 8.
Figure 15:
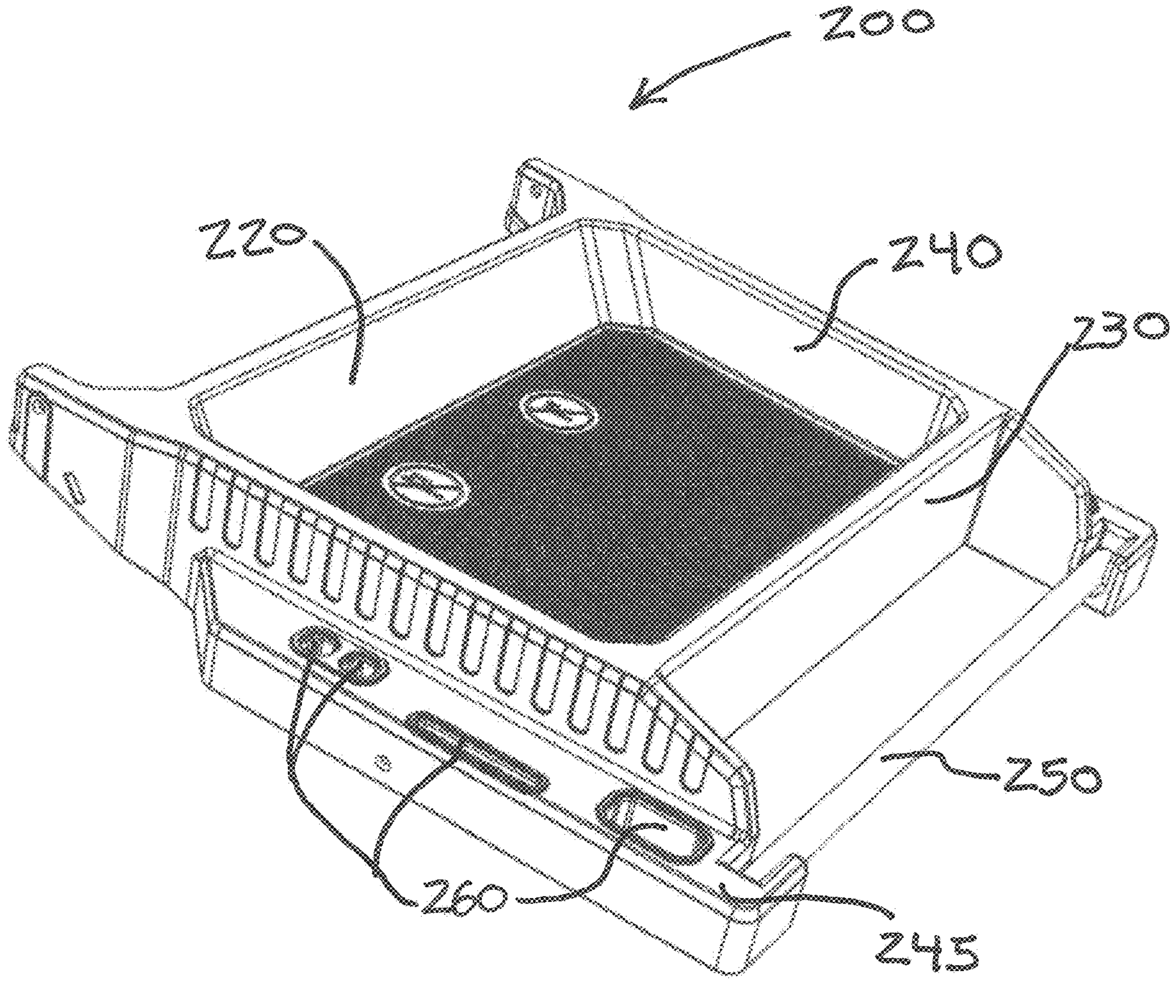
FIG. 15 is a rear isometric view of an embodiment of the deep ladder tray of the invention.
Figure 16:
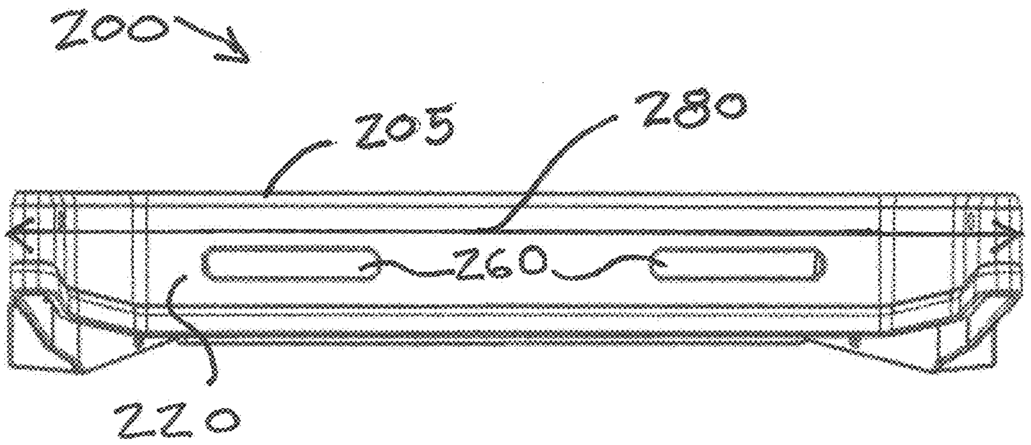
FIG. 16 is a front elevation view of the deep ladder tray of FIG. 15.
Figure 17:
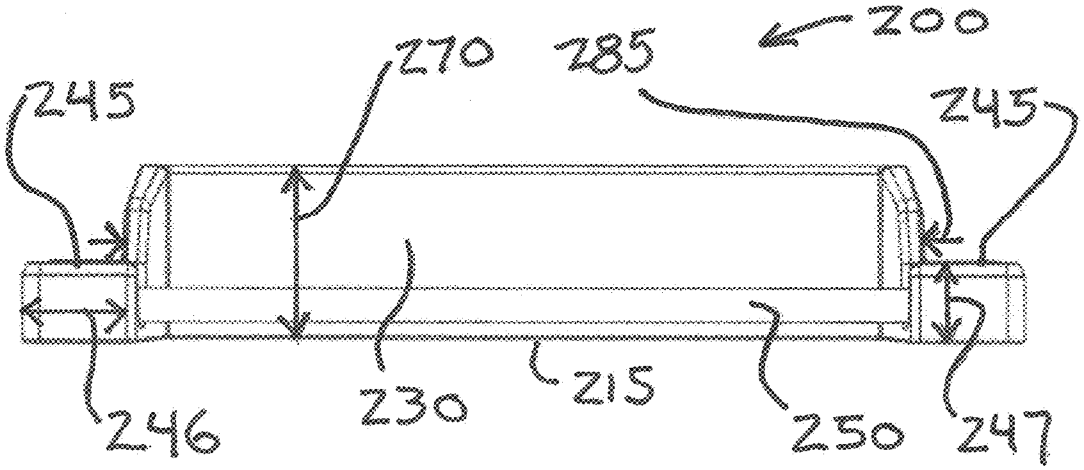
FIG. 17 is rear elevation view of the deep ladder tray of FIG. 15.
Figure 18:
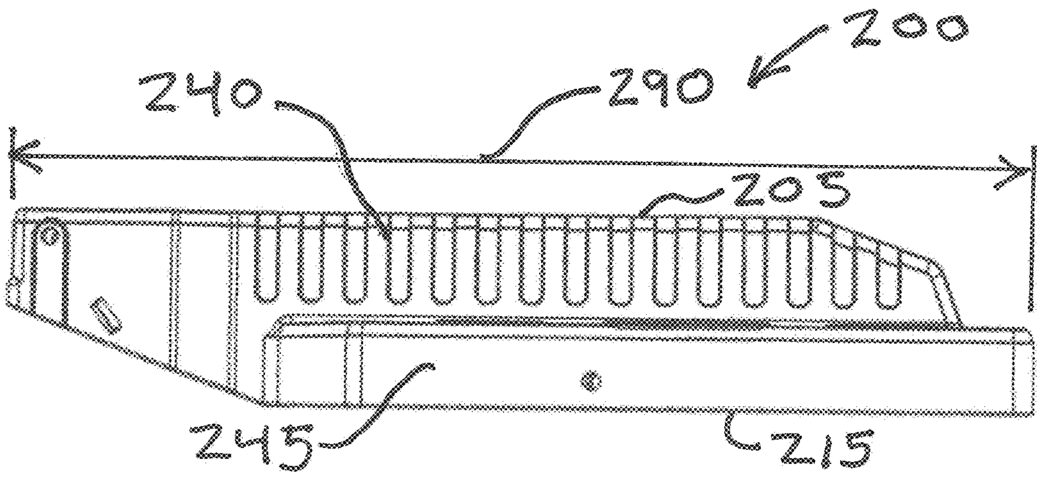
FIG. 18 is right side elevation view of the deep ladder tray of FIG. 15.
Figure 19:
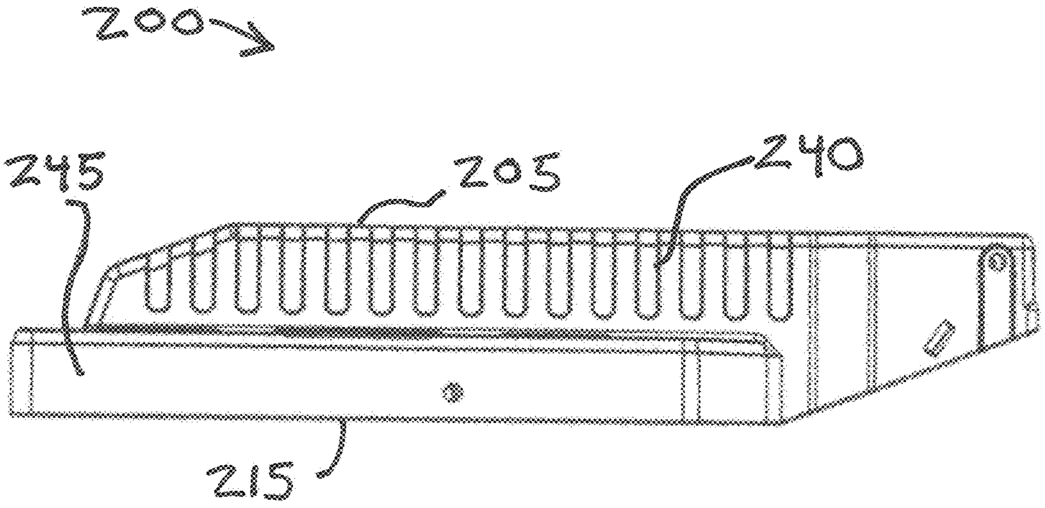
FIG. 19 is a left side elevation view of the deep ladder tray of FIG. 15.
Figure 20:
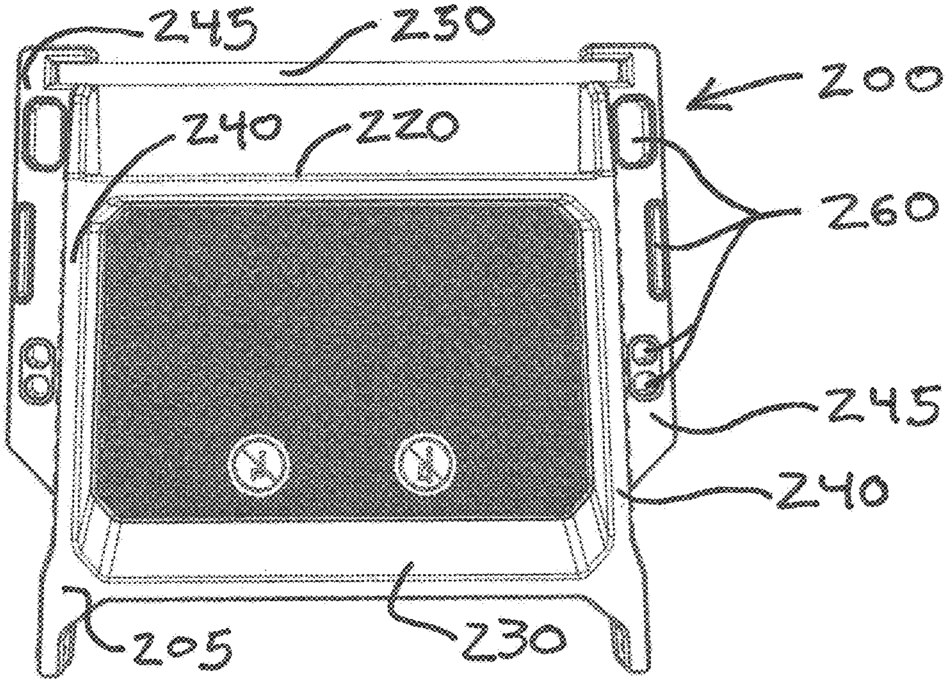
FIG. 20 is a top view of the deep ladder tray of FIG. 15.
Figure 21:
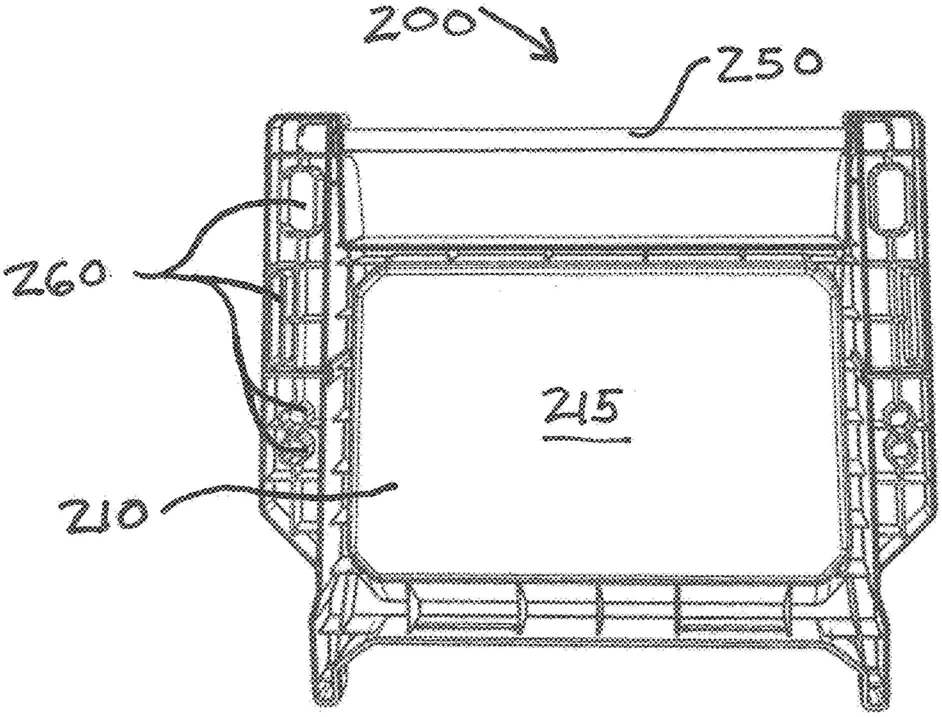
FIG. 21 is a bottom view of the deep ladder tray of FIG. 15.

Attached are drawings of an embodiment of the deep ladder tray of the present invention incorporated into a stepladder in an in-use orientation (FIGS. 1-7) and in a stored orientation (FIGS. 15-21) as well as isolated drawings of the deep ladder tray itself (FIGS. 8-14). It is understood that the various components disclosed in the drawings may be substituted with equivalent components and are not considered limiting.

The following detailed description should be read with reference to the drawings in which similar elements in different drawings are numbered the same. The accompanying figures depict embodiments of the electro-mechanical brake system of the present invention, and features and components thereof. Any references to front and back, right and left, top and bottom, upper and lower, and horizontal and vertical are intended for convenience of description, not to limit the present invention or its components to any one positional or spatial orientation. The drawings, which are not necessarily to scale, depict illustrative embodiments and are also not intended to limit the scope of the invention. Any reference in the claims to a "stepladder" is not intended to limit the scope of the invention to a specific type of climbing device and includes ladders, step stools, etc.

A stepladder according to an embodiment of the invention is depicted in FIGS. 1-7 in the open or in-use orientation and FIGS. 8-14 in the closed or stored orientation by reference numeral 100. Stepladder 100 has front rails 110 and rear rails 120 with a hinge 180 between to allow the stepladder 100 to be placed in an open or in-use orientation (FIGS. 1-7) or in a closed or stored orientation (FIGS. 8-14). Stepladder 100 typically has steps 130 or rungs or a combination of the two between front rails 110 and potentially between rear rails 120. Any reference in the claims to steps is not intended to limit the scope of the invention to a specific type of step, but to any type of step, rung, platform, etc. In lieu of steps 130 or rungs between rear rails 120, cross braces 150 may be used to separate, connect, and support rear rails 120. Angle braces 160 may be used to further support steps 130 and cross braces 150. A top cap 145 may be added to the upper portion of the stepladder 100 to provide a work or tool storage surface and to provide a barrier to increase user safety when on the top step 130 or platform 140 of stepladder 100. Alternatively, instead of a top cap 145, stepladder 100 may merely have a frame or handles at the top of the rails 110, 120.

Stepladder 100 may also have one or more platforms 140 to provide a more secure standing area when stepladder 100 is in use. Platforms 140 for stepladders 100 are typically folding and rely upon links to move the platform 140 from a stored configuration to an in-use configuration. Stepladders 100 also commonly have a foot 170 on the end of the front rails 110 and rear rails 120 to protect surfaces onto which the stepladder 100 is placed and to provide a wider footprint and better traction for the stepladder 100.

In one embodiment, a folding tray 200 is attached to the stepladder 100. In the embodiment depicted in FIGS. 1-21, the tray 200 is attached to the stepladder 100 proximate the hinges 180. In FIGS. 1-7, the tray 200 is in its use orientation and in FIGS. 8-14 the tray is in its stored orientation. FIGS. 15-21 present illustrations of an embodiment of a tray 200 according to the invention. The tray 200 will typically comprise a front wall 220, a rear wall 230, side walls 240, and a bottom 210. The tray also has a top surface 205 that is the uppermost extent of the tray 200. Tray 200 also includes tray shoulders 245 on the tray side walls 240. Tray 200 may also have various features including a tool apertures 260 for holding tools or materials or a hanging bar 250 for hanging tools or materials. Tool apertures 260 and hanging bar 250 may be within or connected to the tray shoulders 245 as shown in FIGS. 1-7 to the front wall 220, rear wall 230, or side walls 240 (not shown).

Tray 200 has a height dimension 290 that represents the outermost dimension of the tray 200 between the exterior of the front wall 220 and exterior of the rear wall 230 in a front-to-back direction, a width dimension 280 that represents the outermost dimension of the tray 200 between exterior of the shoulders 245, and a depth dimension 270 that represents the outermost dimension of the tray 200 in a direction between the top surface 205 and exterior of the bottom surface 215. The combination of these dimensions 270, 280, 290 define the outer boundary of the tray 200. Tray 200 also has a tray width boundary 285, which represents the outermost dimension of the tray 200 between the exterior of the side walls 240. The stepladder 100 also includes a platform gap dimension 115, which represents the distance between the upper edge of the platform 140 and the bottom edge of the top cap 145 when the stepladder 100 is in the stored orientation (FIGS. 8-14).

In the embodiment depicted in FIGS. 1-21, tray 200 forms a single interior storage area between the walls 220, 230, 240 and the bottom 210. However, other embodiments may include multiple storage areas or work areas by including additional walls (not shown).

To facilitate storage of the tray 200 when not in use and to increase the amount of storage space provided an embodiment of the tray 200 fits within the boundaries of the stepladder 100 when the stepladder 100 is in the closed or stored orientation. In this embodiment, the tray height dimension 290 is less than the step gap dimension 115, the tray width dimension 280 is less than the stepladder rail interior width dimension 135 at the location where the tray 200 is in its stored orientation (FIGS. 8-14), and the tray depth dimension 270 is less than the combined rail depth dimension 155. A preferred embodiment includes the front rails 110 and rear rails 120 forming a combined rail depth boundary 165 into which the entirety of the tray 200 rests when the stepladder 100 is in the stored orientation. In a further embodiment, the tray shoulder depth dimension 247 is less than the rear rail depth dimension 157 and the tray shoulder width dimension 246 is less than the front rail width dimension 112. In this configuration the depth of the tray 270 is less than the combined front rail depth dimension 156 and rear rail depth dimension 157. This arrangement maximizes the overall depth of the tray 200 and allowing tool apertures 260 while the tray 200 can fit within the combined rail depth boundary 165 and ladder width boundary 137 when the stepladder 100 is in the stored orientation. The combined rail boundary 199 represents outer edges of the front rails 110 and rear rails 120 within the platform gap dimension 115 when the ladder 100 is in its stored orientation Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

We claim:

1. A ladder tray system comprising:

a ladder having an in-use orientation and a stored orientation comprising:

a front rail comprising a front rail width dimension and a front rail depth dimension;

a rear rail coplanar with the front rail in the in-use orientation comprising a rear rail depth dimension;

a step;

a platform; and a tray comprising:

a tray width dimension;

a tray height dimension;

a tray depth dimension; and a tray shoulder comprising a tray shoulder depth dimension and a tray shoulder width dimension, the tray shoulder depth dimension being less than the tray depth dimension;

a ladder width boundary;

a combined rail depth boundary; and wherein the tray width dimension fits within the ladder width boundary when the ladder is in the stored orientation;

wherein the tray depth dimension fits within the combined rail depth boundary when the ladder is in the stored orientation; and wherein the tray shoulder depth dimension is less than or equal to the rear rail depth dimension.

2. The ladder tray system of claim 1 wherein the tray shoulder width dimension is less than or equal to the front rail width dimension.

3. The ladder tray system of claim 2 further comprising a platform gap dimension and wherein the tray height dimension fits within the platform gap dimension when the ladder is in the stored orientation.

4. The ladder tray system of claim 2 wherein the shoulder comprises a tool aperture.

5. The ladder tray system of claim 2 further comprising a hanging bar.

6. The ladder tray system of claim 2 further comprising a link between the tray and platform wherein pivoting the platform with respect to the front rail or rear rail results in pivoting of the tray.

7. The ladder tray system of claim 6 further comprising a tray bottom surface wherein the tray bottom surface is substantially parallel to the rear rail when the ladder is in the stored orientation.

8. The ladder tray system of claim 6 wherein the tray rests entirely within a combined rail depth boundary when the ladder is in the stored orientation.

9. The ladder tray system of claim 2 wherein the tray depth dimension is larger the rear rail depth dimension and larger than the front rail depth dimension.

10. The ladder tray system of claim 2 further comprising a rail interior width dimension wherein the wherein the tray width boundary fits within the rail interior width dimension when the ladder is in the stored orientation.

11. The ladder tray system of claim 3 wherein the tray depth dimension is larger the rear rail depth dimension and larger than the front rail depth dimension.

12. A tray for use in combination with a ladder, the tray comprising:

a tray width dimension;

a tray height dimension;

a tray depth dimension; and a tray shoulder comprising a tray shoulder depth dimension and a tray shoulder width dimension, the tray shoulder depth dimension being less than the tray depth dimension;

wherein the tray has an in-use orientation and a stored orientation and is pivotably attached to a ladder, the ladder comprising:

a front rail comprising a front rail width dimension and a front rail depth dimension;

a rear rail coplanar with the front rail in the in-use orientation comprising a rear rail depth dimension;

a step; and a platform;

wherein the tray shoulder width dimension is less than or equal to the front rail width dimension and the tray shoulder depth dimension is less than or equal to the rear rail depth dimension.

13. The of claim 12 further comprising a platform gap dimension and wherein the tray height dimension fits within the platform gap dimension when the tray is in the stored orientation.

14. The tray of claim 12 wherein the ladder further comprises:

a ladder width boundary;

a combined rail depth boundary; and wherein the tray width dimension fits within the ladder width boundary when the tray is in the stored orientation; and wherein the tray depth dimension fits within the combined rail depth boundary when the tray is in the stored orientation.

15. The tray of claim 14 wherein the tray rests entirely within a combined rail depth boundary when the tray is in the stored orientation.

16. The tray of claim 15 wherein the tray depth dimension is larger than the rear rail depth dimension.

17. The tray of claim 16 wherein the tray depth dimension is larger than the front rail depth dimension.

18. The ladder tray system of claim 12 wherein the shoulder comprises a tool aperture.

19. The ladder tray system of claim 16 further comprising a link between the tray and platform wherein pivoting the platform with respect to the front rail or rear rail results in pivoting of the tray.

20. A ladder having an in-use orientation and a stored orientation comprising:

a front rail comprising a front rail width dimension and a front rail depth dimension;

a rear rail coplanar with the front rail in the in-use orientation comprising a rear rail depth dimension;

a step;

a tray comprising:

a tray width dimension;

a tray height dimension;

a tray depth dimension; and a tray shoulder comprising a tray shoulder depth dimension and a tray shoulder width dimension, the tray shoulder depth dimension being less than the tray depth dimension;

a ladder width boundary;

a combined rail depth boundary; and wherein the tray width dimension fits within the ladder width boundary when the ladder is in the stored orientation;

wherein the tray depth dimension fits within the combined rail depth boundary when the ladder is in the stored orientation;

wherein the tray shoulder depth dimension is less than or equal to the rear rail depth dimension; and wherein the tray shoulder width dimension is less than or equal to the front rail width dimension.

* * * * *